United States Patent [19]

Berendzen

[11] 4,078,458
[45] Mar. 14, 1978

[54] SCREW EXTRACTOR

[76] Inventor: Ray Berendzen, P.O. Box 179, Kimbolton, Ohio 43749

[21] Appl. No.: 732,082

[22] Filed: Oct. 13, 1976

[51] Int. Cl.² .......................................... B25B 13/48
[52] U.S. Cl. ........................................ 81/71; 29/240; 81/53.2; 408/230
[58] Field of Search ................... 29/213, 240, 282; 81/71, 53.2; 408/118, 230

[56] References Cited

U.S. PATENT DOCUMENTS

| 1,863,046 | 6/1932 | Githers et al. | 81/71 |
| 2,863,348 | 12/1958 | Conger | 81/71 |
| 3,654,690 | 4/1972 | Hardin | 81/71 |

*Primary Examiner*—James L. Jones, Jr.
*Attorney, Agent, or Firm*—Robert D. Farkas

[57] ABSTRACT

A screw extractor utilizes a twist drill affixed to one end of an extractor bit having a shank portion suitable for grasping by the chuck end of an electric drill. In use, the drill causes a hole to be formed along the length of the body of the screw to be extracted. Continued rotation in a selected direction of the assembly causes the extractor bit to grasp the walls of the hole. The screw is easily removed without requiring the user to first drill a hole and then manually remove the screw utilizing a separate extractor bit.

6 Claims, 2 Drawing Figures

SCREW EXTRACTOR

BACKGROUND OF THE INVENTION

1. Field of the Invention

This invention relates to screw extractors and more particularly to that class of unitary devices which dispose a pilot hole in the screw to be extracted.

2. Description of the Prior Art

The prior art abounds with screw extractors. U.S. Pat. No. 2,863,348 issued on Dec. 9, 1958 to D. L. Conger teaches a twisted surface forming a screw extractor adapted for use by placing the twisted surface in a pilot hole located in the screw.

U.S. Pat. No. 3,263,533 issued on Aug. 2, 1966 to R. H. Carlson discloses an elongated rod having a concentrically aligned cylindrical surface at one end. The cylindrical surface is of smaller diameter than the elongated rod and is provided with metal cutting tapping flutes extending along the length of the cylindrical surface. In use, the tapping threads tap into the walls of a pre-drilled pilot hole in the screw to be extracted, until the shoulder portion delineating the cylindrical surface and the elongated rod portions contact the surface of the screw adjacent the mouth of the hole. Continued rotation causes the screw to be extracted from the hole containing it.

Both of the aforementioned patents suffer the common deficiency of requiring the artisan to first drill the pilot hole and then either employ a manually or power driven screw extractor to remove the screw.

SUMMARY OF THE INVENTION

A primary object of the present invention is to provide a screw extractor which utilizes a drill machine in a single operation, causing the pilot hole to be drilled and the screw to be then extracted.

Another object is to provide a screw extractor which utilizes a drill machine to rotate an extractible screw out of confinement.

Still another object is to provide a screw extractor which can be operated in an electric drill machine of the handheld variety.

Yet another object is to provide a screw extractor in accordance with the preceding objects which is simple in construction, relatively inexpensive and effective for its particular purposes.

Heretofore, it was necessary to first drill a pilot hole in a screw or bolt resistingly lodged within a body. The artisan could then utilize an electrically operated drill or a hand operated drill or a tapping wrench to apply a screw extracting bit to the hole. By rotating the bit in a preferred direction, the screw is removed from the body. These processes required the artisan to minimally utilize two separate devices, the drill bit and the extractor bit, matching them in size, and if an electrically operated drill machine were utilized for both, required him to sequentially chuck them to the drill machine. The present invention provides a unitary device which firstly drills a pilot hole and then applies the coextensive surface of the extractor bit to the walls of the hole. Size matching is automatic and multiple chucking operations are limited.

These objects, as well as other objects of the present invention, will become more readily apparent after reading the following description of the accompanying drawings.

DETAILED DESCRIPTION OF THE PREFERRED EMBODIMENT

Figure 1:
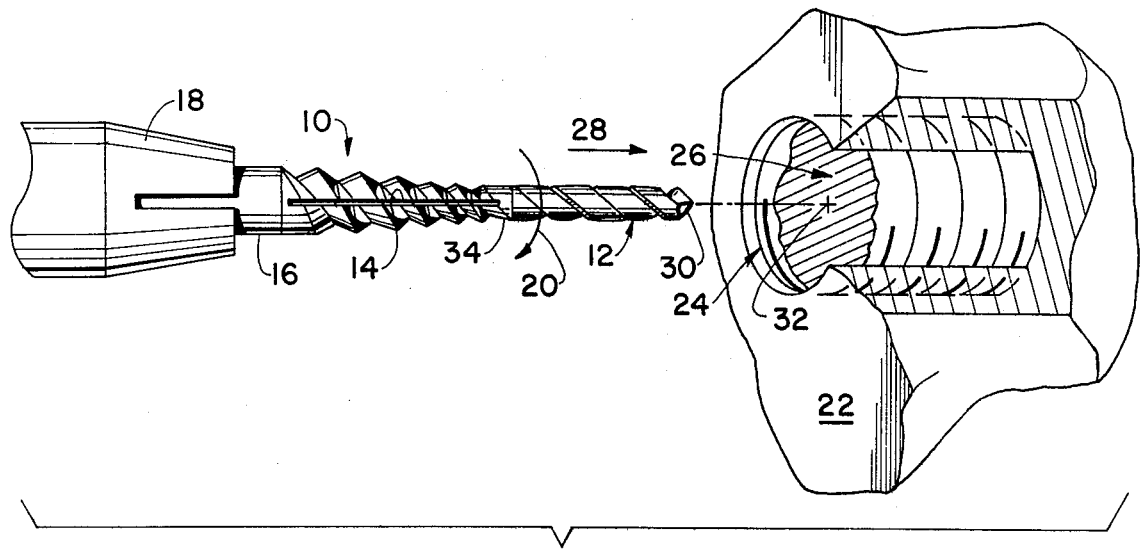
FIG. 1 is a side elevation view of the present invention shown adjacent to a body carrying a defective screw.

The structure and method of fabrication of the present invention is applicable to a metal cutting twist drill having a flute extending along the entire length thereof. The end of the drill opposite to the end carrying the metal cutting tapered point is affixed to the apex end of a truncated conical metal extractor bit and co-axially aligned thereto. The extractor bit is secured to a shank-like rod at the base portion of the conical surface such that the shank, the extractor bit and the drill bit are each co-axially aligned with each other. The direction of the spiral of the flute of the drill bit and the direction of the spiral groove located in the surface of the extractor bit may be identical or opposed facilitating the removal of right handed and left handed threaded broken screws from within holes located in the body in which they reside. Since most electrically operated drill machines are now available with the capability of being operated in either clockwise or counterclockwise directions, one embodiment of the present invention employs right handed twist drill portions and left handed extractor bit portions. In use the twist drill would extend entirely through the length of the broken screw, so as to place the metal cutting tip of the twist drill beyond the distal end of the screw residing in the cavity in the hole in the body formed by the distal end of the screw and the walls and floor of the hole. Thus, the present invention may be advanced along the length of the pilot hole allowing the apex of the truncated conical surface of the extractor bit to contact the walls of the pilot hole. Reversing the electrically operated drill machine permits the grooves of the extractor bit to bite into the walls of the pilot hole, causing the screw to be threadingly removed from the hole in the body capturing the screw. Alternatively, another embodiment of the present invention is where the drill bit flutes and the extractor bit grooves both extend spirally in the same direction. Since most screws are right handed threads, this direction would be left handed. In use, the electrically operated drill machine would be operated in the counterclockwise direction permitting the drill bit to form a blind hole in the defective screw, if so desired. The metal cutting end of the drill bit would be advanced into or through the screw a sufficient distance to permit the apex of the conical surface of the extractor bit to engage the walls of the pilot hole, druing a period of continuous unidirectional rotation of the electrically operated drill. Left handed defective screws may be removed in similar fashion by utilizing a drill bit portion and an extractor bit portion of the present invention each having a conventional right hand twist. Both of the latter two embodiments do not require reversing the direction of rotation of the electrically operated drill machine or its equivalent.

The diameter of the apex of the conical surface of the extractor bit should substantially match the diameter of the drill bit insuring that the biting surfaces of the extractor bit easily engage the walls of the pilot hole. The rod portion affixed to the widest end of the extractor bit portion serves as a shank for the present invention and should be of a diameter substantially equivalent to the diameter of the base of the extractor bit thereby minimizing breakage due to the high forces required to extract broken screws. An elongated groove may be formed in the conical surface of the extractor bit, extending substantially along the entire length thereof, whose longitudinal axis falls in a plane that passes through the longitudinal axis of the extractor bit. The elongated groove serves to provide additional pilot hole wall grasping surfaces.

Now referring to the Figures, and more particularly to the embodiment illustrated in FIG. 1 showing the present invention 10 comprising a right handed twist drill portion 12 affixed to an extractor bit portion 14 which in turn is affixed to a cylindrical rod portion 16. Chuck 18 attached to an electrically or manually operated drill machine, not shown, provides a rotational force in the direction of arrow 20 to the present invention. Body 22 contains a threaded hole 24 in which a defective screw or bolt 26 threadingly resides. Advancing the present invention in the direction of arrow 28 causes the tapered cutting point 30 of drill portion 12 to contact screw 26 at point 32, drilling a hole therein. If the hole has sufficient depth, end 34 of extractor bit 14 is permitted to engage the walls of the hole so that screw 26 may be extracted from hole 24 by continued rotation of the present invention in the direction of arrow 20.

Figure 2:
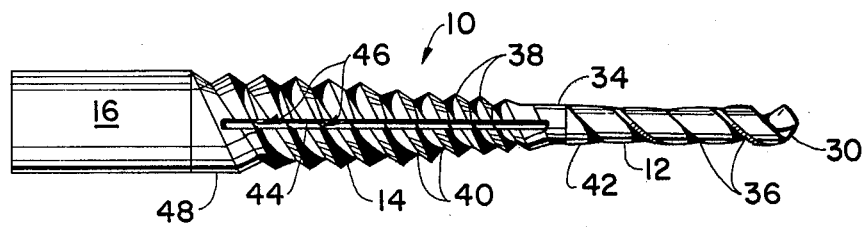
FIG. 2 is a side elevation view of the present invention.

FIG. 2 shows drill bit portion 12 having a spirally wound flute 36 extending along the length thereof and communicating with cutting point 30. Extractor bit portion 14 is shown having a truncated conical surface 38 in which a spiral groove 40 is located. The apex end 34 of extractor bit portion 14 is shown secured to end 42 of the drill bit portion. Elongated groove 44 extends substantially along the entire length of extractor bit portion 14 providing pilot hole grasping surfaces 46. Rod 16 is shown secured to the base or widest end 48 of extractor bit portion 14.

One of the advantages is to provide a screw extractor which utilizes a drill machine in a single operation, causing the pilot hole to be drilled and the screw to be then extracted.

Another advantage is to provide a screw extractor which utilizes a drill machine to rotate an extractible screw out of confinement.

Still another advantage is to provide a screw extractor which can be operated in an electric drill machine of the handheld variety.

Yet another advantage is to provide a screw extractor in accordance with the preceding advantages which is simple in construction, relatively inexpensive and effective for its particular purposes.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A screw extractor comprising a rod, a twist drill having metal cutting surfaces disposed at one end thereof, the twist drill having at least one spirally wound flute extending from the metal cutting surfaces, said flute having the external portion of the exterior surfaces thereof defining a cylindrical surface, said cylindrical surface being parallel to the longitudinal axis of said twist drill, an elongated rod having a truncated conical exterior surface co-axially aligned with the longitudinal axis thereof, said conical exterior surface having at least one spirally wound groove disposed extending longitudinally from the apex of said conical exterior surface, said groove forming work engaging ribs extending in a continuous spiral path along said conical exterior surface, the other end of the twist drill being disposed fixedly secured to said apex of said conical exterior surface, one end of said rod being disposed fixedly secured to the base of said conical exterior surface, said longitudinal axis of said elongated rod and said longitudinal axis of said twist drill and the longitudinal axis of said rod being disposed in coaxial alignment.

2. The screw extractor as claimed in claim 1 wherein the direction of twist of said flute is the same as the direction of twist of said groove.

3. The screw extractor as claimed in claim 1 wherein the direction of twist of said flute is opposed to the direction of twist of said groove.

4. The screw extractor as claimed in claim 1 further comprising at least one elongated groove being disposed in said conical exterior surface of said elongated rod, the elongated groove being disposed residing in a plane passing through said longitudinal axis of said elongated rod.

5. The screw extractor as claimed in claim 1 wherein the outside diameter of said twist drill is substantially equal to the diameter of said conical exterior surface at said apex.

6. The screw extractor as claimed in claim 1 wherein the outside diameter of said rod is substantially equal of the diameter of said conical exterior surface at said base.

* * * * *